(12) United States Patent
Swan (10) Patent No.: US 6,698,300 B2
(45) Date of Patent: Mar. 2, 2004

(54) ACTUATOR UNIT

(75) Inventor: Oliver Swan, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/741,066

(22) Filed: Dec. 21, 2000

(65) Prior Publication Data

US 2001/0003925 A1 Jun. 21, 2001

(30) Foreign Application Priority Data

Dec. 21, 1999 (JP) .......................................... 11-363005

(51) Int. Cl.[7] ................................................ E05C 3/04
(52) U.S. Cl. ...................... 74/89.18; 74/111; 74/422; 74/664; 403/348; 49/279; 292/201
(58) Field of Search ............... 74/664, 665 R, 74/665 B, 89.14, 89.18, 435, 462, 111, 422; 403/348; 49/279, 280, 287; 292/201

(56) References Cited

U.S. PATENT DOCUMENTS

| | | | |
|---|---|---|---|
| 3,335,471 A | * | 8/1967 | Seckerson et al. .......... 403/348 |
| 4,520,914 A | * | 6/1985 | Kagiyama et al. ............ 192/71 |
| 4,653,708 A | * | 3/1987 | Rich ......................... 403/348 |
| 4,893,426 A | * | 1/1990 | Bixler .................... 403/348 X |
| 5,516,167 A | * | 5/1996 | Hayakawa et al. .......... 292/201 |
| 5,564,308 A | | 10/1996 | Hoshikawa et al. |
| 5,649,726 A | * | 7/1997 | Rogers, Jr. et al. .......... 292/201 |
| 5,746,076 A | * | 5/1998 | Inoue ..................... 292/201 X |
| 6,076,868 A | * | 6/2000 | Roger, Jr. et al. .......... 292/201 |
| 6,102,453 A | * | 8/2000 | Cetnar ......................... 292/201 |
| 6,223,468 B1 | * | 5/2001 | Kobayashi ................... 49/280 |

FOREIGN PATENT DOCUMENTS

| | | |
|---|---|---|
| EP | 0 770 747 A1 | 5/1997 |
| GB | 2 306 551 | 5/1997 |
| JP | 8-144602 | 6/1996 |
| WO | WO97/03268 A1 | 1/1997 |

* cited by examiner

Primary Examiner—David A. Bucci
Assistant Examiner—Colby Hansen
(74) Attorney, Agent, or Firm—Browdy and Neimark, P.L.L.C.

(57) ABSTRACT

An actuator unit comprises a worm wheel rotated by a motor and having an output gear, a rotational lever having a toothed portion engaged with the output gear. The output gear has one first motor side gear tooth, two second motor side gear teeth, and two third motor side gear teeth which are shifted in three stages in an axial direction of a wheel shaft. The toothed portion has two first lever side gear teeth engageable only with the first motor side gear tooth, one second lever side gear tooth engageable only with the second motor side gear teeth, and one third lever side gear tooth engageable only with the third motor side gear teeth. The toothed portion does not rotate the output gear when the rotational lever is rotated while the worm wheel is located in a neutral position.

8 Claims, 7 Drawing Sheets

ACTUATOR UNIT

TECHNICAl FIELD

The present invention relates to a motorized actuator unit which is suitable to displace a lock lever of a vehicle door latch apparatus between a locked position and an unlocked position.

BACKGROUND OF THE INVENTION

Figure 15:
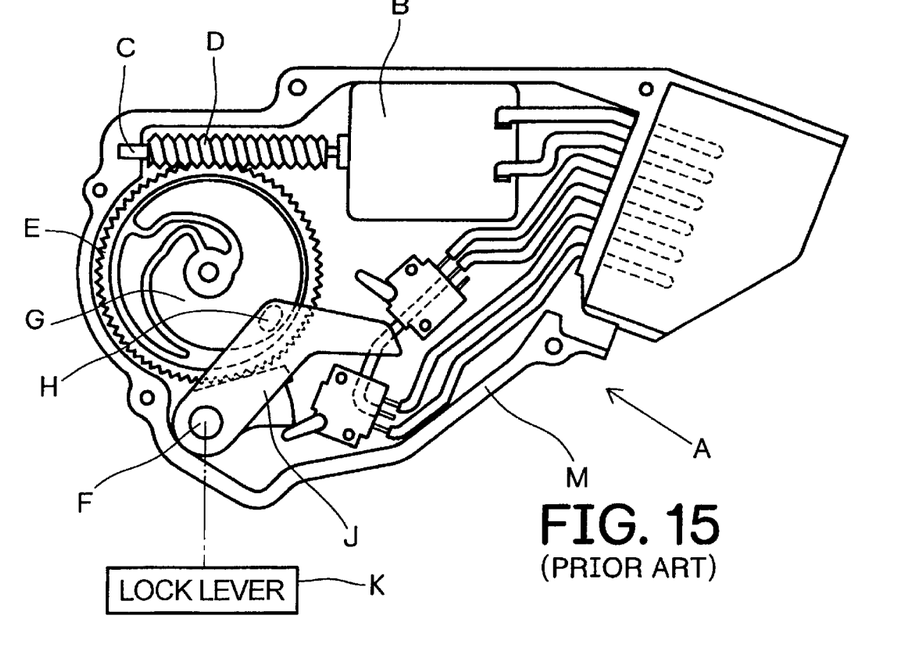
FIG. 15 is a plain view of a conventional actuator unit.
Figures 16, 17:
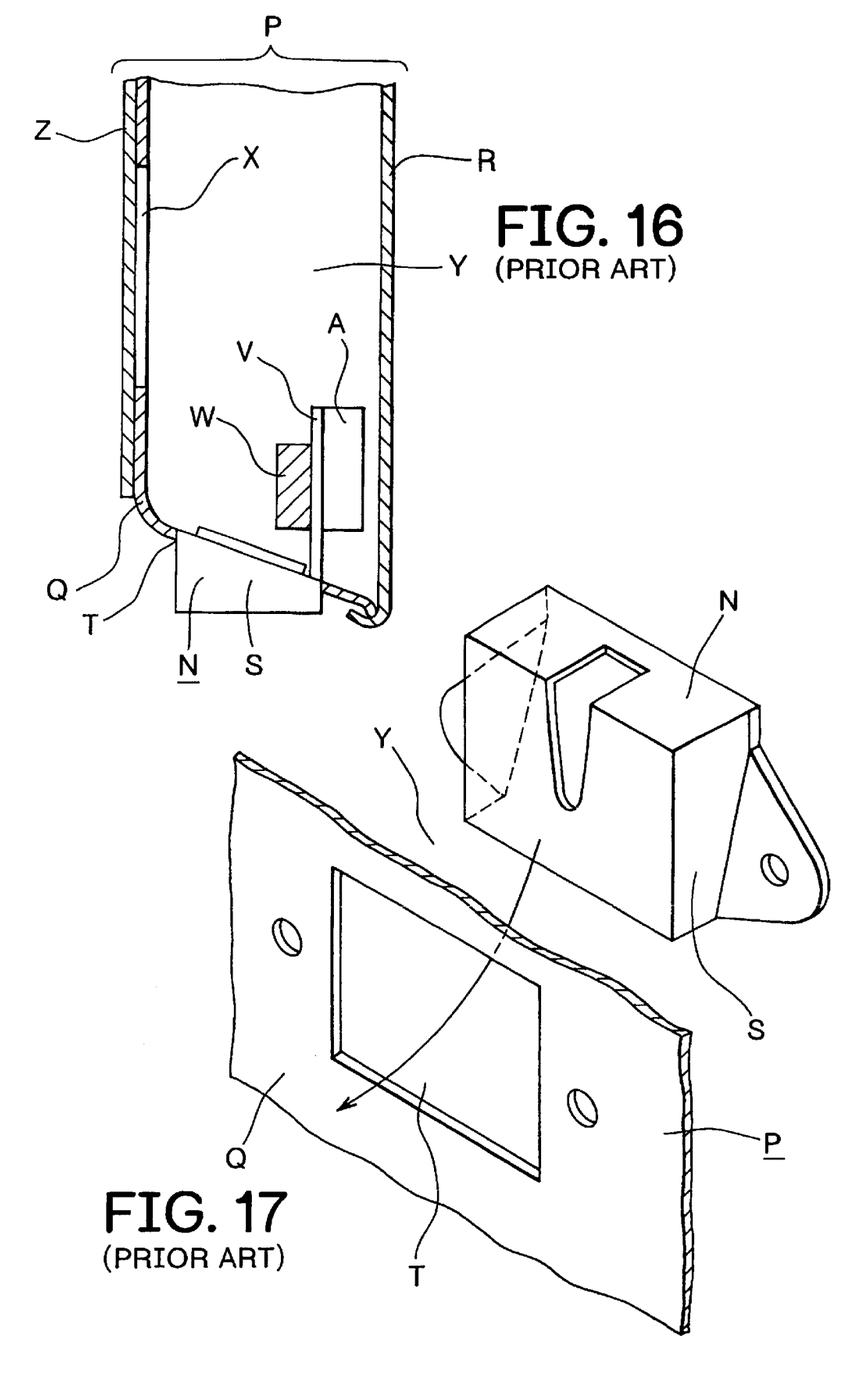
FIG. 16 is a cross sectional view showing a relation among a conventional door latch apparatus, the conventional actuator unit, and a wall assembly of a tailgate.
FIG. 17 is a perspective view showing a relation between the conventional door latch apparatus and the wall assembly.

Conventionally, various actuator units which displace a change-over member between a first position and a second position by motor power. One of them which is closely related to the present invention is shown in FIGS. 15 to 17. This actuator unit A is provided with a cylindrical worm D attached to a motor shaft C of a motor B, and a worm wheel E engaged with the cylindrical worm D (for example, Japanese Patent Laid-Open Publication No. 08-144602 and U.S. Pat. No. 5,564,308). As an example of the change-over member, a lock lever of a vehicle door latch apparatus which is displaced between a locked position and an unlocked position is exemplified.

The actuator unit A of this type includes a cam groove G defined on an top surface of the worm wheel E, and a rotational lever J fixed to an output shaft F and having a contact pin H engaged with the cam groove G for transmitting a rotational force of the worm wheel E to the output shaft F. The worm wheel E is regularly held on a neutral position by a spring force of a return spring (not shown). The cam groove G and the contact pin H also function a clutch mechanism which does not transmit rotation of the rotational lever J to the worm wheel E when the worm wheel E is located on the neutral position. A lock lever K is fixed to an outer end of the output shaft F which projects outside a housing M of the unit.

The conventional actuator unit A has a disadvantage such that moving amount (rotational amount) of the rotational lever J is rather small. The moving amount of the contact pin H of the rotational lever J is subject to a width of the cam groove G which is not longer than a radius of the worm wheel E. In FIG. 15, when the diameter of the worm wheel E is considered to be "40", the width of the cam groove G is about "12" and the width of the contact pin H is about "3". Therefore, the moving amount of the contact pin H is about "9" which is merely a quarter of the diameter of the worm wheel E, and a rotational angle of the rotational lever J is considered to be about"20 degrees". If the worm wheel E and the rotational lever J are coupled each other using a gear teeth coupling, it is possible to set the moving amount of the rotational lever J without depending on the diameter of the worm wheel E, but a function of the clutch mechanism is lost.

Further, the conventional actuator unit A involves a second disadvantage that it is troublesome for coupling the rotational lever J located inside the housing M and a lock lever (output lever) K located outside the housing M. That is, the lock lever K is coupled to the exposed outer end of the output shaft F by using a typical fixing means such as a screw, an adhesive, and a supersonic deposit means or the like.

Further, the conventional actuator unit A involves a third disadvantage that a shape of the housing M is not appropriate. The vehicle door latch apparatus and the actuator unit are mounted in a narrow space of the door or the vehicle body, so it should be formed compact. Especially, the actuator unit A to be mounted on either one of a tailgate (back door/trunk lid) and a cargo room (trunk room) should be formed more compact. FIGS. 16 and 17 show a relation between a door latch apparatus N and a wall assembly P of the tailgate. The wall assembly P is configured by an inner metal panel Q usually facing to the cargo room, and an outer metal panel R facing to the outside of the vehicle. A thickness thereof is about 5 cm. The inner panel Q has a mounting hole T which has a size of a latch body S of the door latch apparatus N. The latch body S is provided with a bracket V to which operation levers W such as an open lever and a lock lever or the like and the actuator unit A are attached.

The door latch apparatus N with the actuator unit A is inserted into an inside space Y of the wall assembly P through a service hole X formed in the inner panel Q, and the latch body S except flanges thereof projects to the outside via the mounting hole T, and then the latch body S is fixed to the inner panel Q by screws or the like. The service hole X is covered by a trim panel Z. Most of the above assembly operation is performed blindly and it is very troublesome.

On the contrary, if the door latch apparatus N is not provided with the actuator unit A, the latch apparatus N is capable of being directly mounted on the mounting hole T by inserting the bracket V and the lever group W into the inner space Y through the mounting hole T, so that the assembly operation becomes very easy. This means that a shape and a size of the conventional actuator unit A are not suitable to pass through the mounting hole T.

SUMMARY OF THE INVENTION

An object of the present invention is to provide an actuator unit which is capable of setting a moving amount (rotational amount) of a rotational lever without depending on a radius of a worm wheel.

Another object of the present invention is to provide an actuator unit which is capable of coupling a rotational lever located inside a housing and a lock lever located outside the housing, without using a fixing means such as a screw, an adhesive and a supersonic deposit means.

Further, still another object of the present invention is to provide an actuator unit which has a shape suitable to passing through a mounting hole of a wall assembly.

DESCRIPTION OF THE PREFERRED EMBODIMENTS

Preferable embodiments of the present invention will be specifically explained below with reference to the drawings. An actuator unit 1 according to the present invention has a synthetic resin housing 2 composing of a base case 2A and a cover case 2B (FIG. 11) fixed to the base case 2A. The housing 2 stores a motor 3, a cylindrical worm 5 attached to a motor shaft 4 of the motor 3, and a worm wheel 6 meshed with the cylindrical worm 5. The worm wheel 6 is supported by a wheel shaft 7 which is disposed on a left side (a lower side in FIG. 1) of the cylindrical worm 5.

Figure 1:
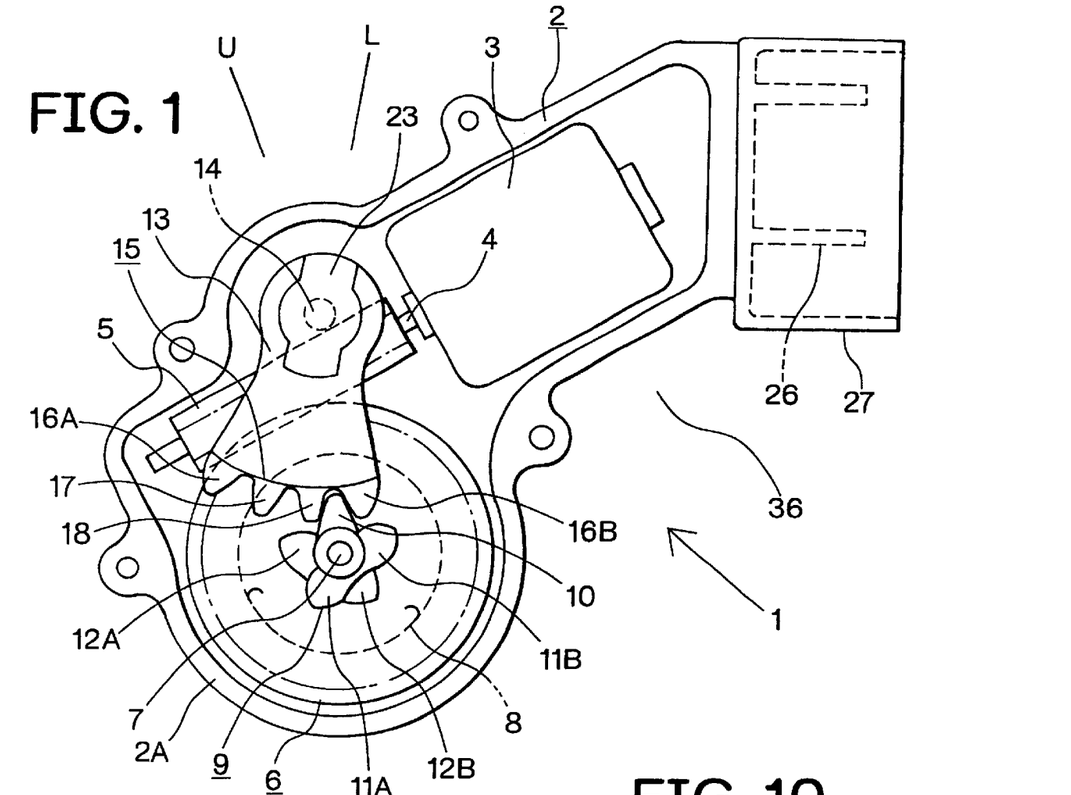
FIG. 1 is a plain view of an actuator unit in a locked state according to the present invention.
Figures 2, 3, 4:
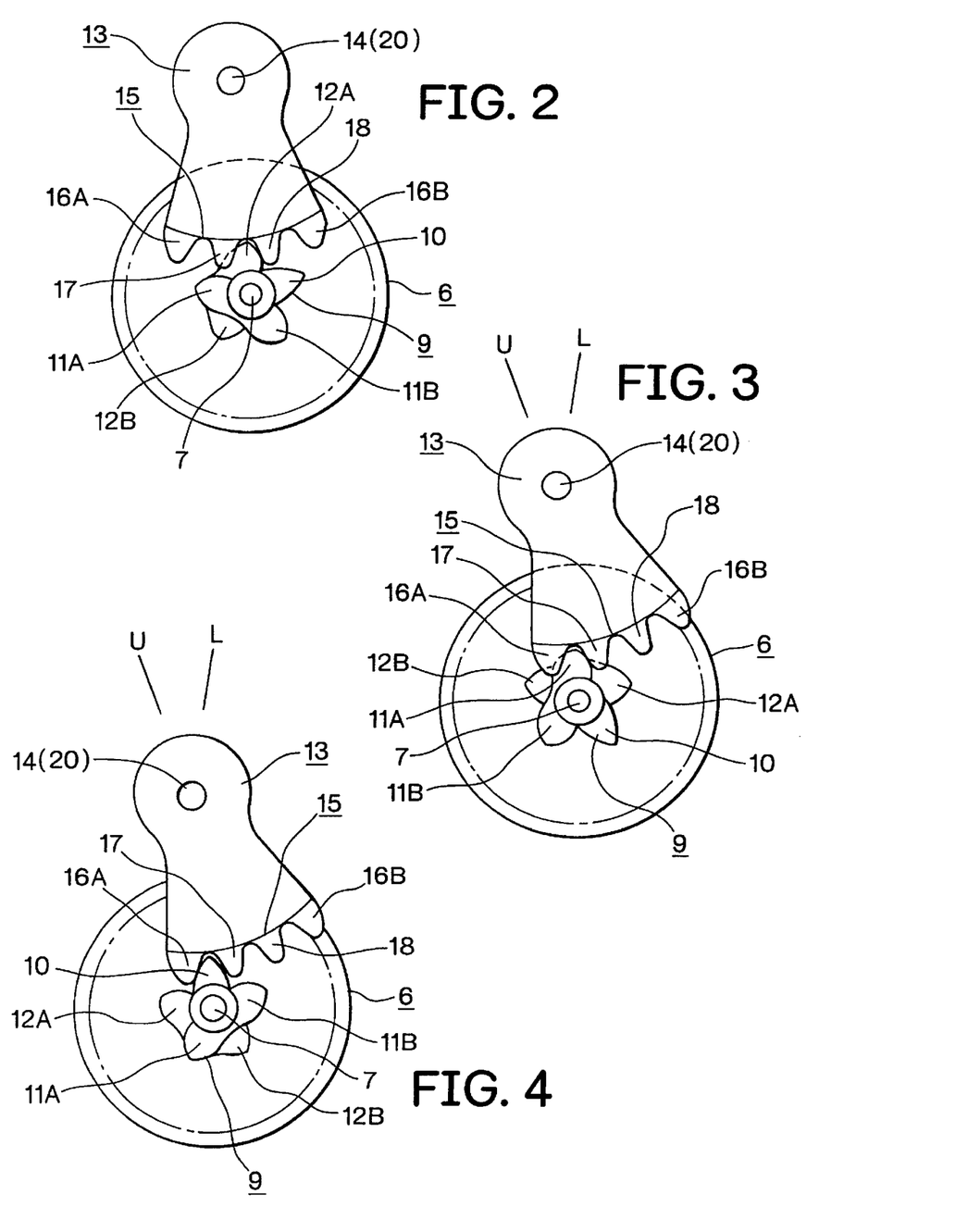
FIG. 2 is a plain view showing a state that a worm wheel of the actuator unit is rotated in an unlocking (clockwise) direction from the locked state by a motor.
FIG. 3 is a plain view showing a state that a rotational lever of the actuator unit is displaced to an unlocked position by an unlocking rotation of the worm wheel.
FIG. 4 is a plain view showing a state that the worm wheel is restored from the state in FIG. 3 to a neutral position by a return spring.

The worm wheel 6 is regularly held on a neutral position shown in FIGS. 1 and 4 by the spring force of a return spring 8 to be rotated by the power of the motor 3 from the neutral position to the both directions. An output gear 9 is fixed to the wheel shaft 7 to rotate together with the worm wheel 6 as one-piece. The output gear 9 has a plurality of, preferably, five pieces of motor side gear teeth, namely, a single first motor side gear tooth 10, a pair of second motor side gear teeth 11A and 11B, and a pair of third motor side gear teeth 12A and 12B, which are disposed with a very long pitch. As shown in FIGS. 5 to 9, the gear teeth are shifted in three stages in an axial direction of the wheel shaft 7. The first tooth 10 is disposed above the second teeth 11A, 11B, and the third teeth 12A, 12B are disposed below the second teeth 11A, 11B. The second teeth 11A, 11B and the third teeth 12A, 12B are disposed symmetrically each other.

A rotational lever 13 is rotatably attached to the housing 2 by an attaching shaft 14. The attaching shaft 14 is preferably formed with the base case 2A of the housing 2 as one-piece, and the rotational lever 13 is installed on an outer periphery of the attaching shaft 14. The attaching shaft 14 is disposed on a right side (upper side in FIG. 1) of the cylindrical worm 5. Therefore, the cylindrical worm 5 is positioned between the attaching shaft 14 and the wheel shaft 7 of the worm wheel 6.

A toothed portion 15 defined on a circular arc edge of the rotational lever 13 is meshed with the output gear 9. Lever side gear teeth 16A, 16B, 17 and 18 of the toothed portion 15 also have long pitches and are shifted in three stages in the axial direction of the attaching shaft 14 as same as the motor side teeth. The first lever side teeth 16A and 16B are respectively formed on the both sides of the upper portion of the toothed portion 15, so that the first teeth 16A, 16B are engageable only with the first motor side gear tooth 10. The second lever side gear tooth 17 is defined on a middle portion of the toothed portion 15, so that the second tooth 17 is engageable only with the second motor side gear teeth 11A, 11B. Further, the third lever side gear tooth 18 is defined on a lower portion of the toothed portion 15, so that the third tooth 18 is engageable only with the third motor side gear teeth 12A, 12B.

The rotational lever 13 is displaceable between a locked position L and an unlocked position U by engagement of the output gear 9 and the toothed portion 15 in response to the rotation of the worm wheel 6 by the motor power. The rotational lever 13 is coupled to a synthetic resin output lever 19 (FIG. 12) which is disposed on the outside of the housing 2.

Figure 12:
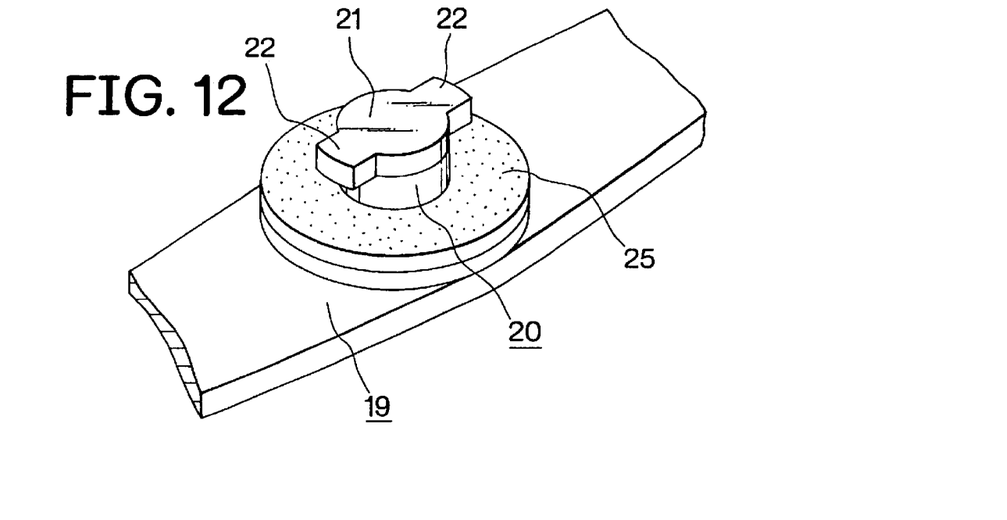
FIG. 12 is a partial cut perspective view of an output lever.

As shown in FIG. 12, the output lever 19 has an output shaft 20 and a T-head 21 formed on a tip end of an output shaft 20 as one-piece. The T-head 21 is provided with protrusions 22, 22 which project to a radial direction of the output shaft 20.

Figure 10:
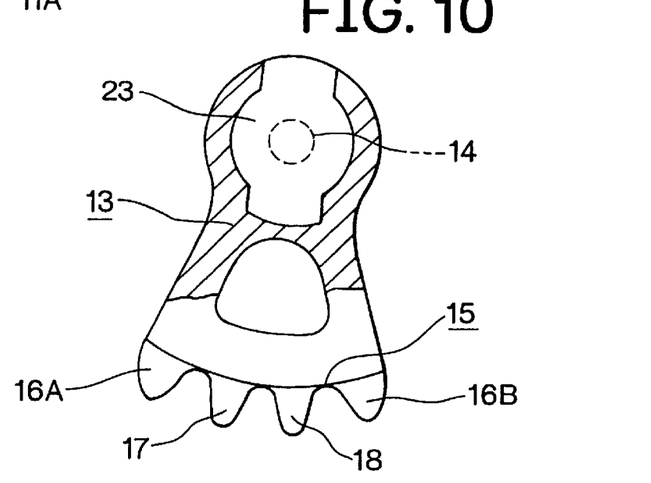
FIG. 10 is a partial cross sectional plan view of the rotational lever.

As shown in FIG. 10, the rotational lever 13 has, at a base portion thereof, a T-shaped recess 23 into which the T-head 21 of the output shaft 20 is fitted. The T-head 21 is inserted in the housing 2 through a T-shaped shaft hole 24 (FIG. 11) formed on the cover case 2B of the housing 2, and is then engaged with the T-shaped recess 23 of the rotational lever 13. Thus, the output lever 19 is rotated together with the rotational lever 13 as one-piece. A gap between the output shaft 20 and the shaft hole 24 is sealed by a sealing member 25 attached to the output lever 19.

The rotational lever 13 is rotated by the motor power of the motor 3 between the locked position L shown in FIG. 1 and the unlocked position U shown in FIG. 4. In this rotational range, a direction of the T-shaped recess 23 of the rotational lever 13 is not identical with the direction of the T-shaped shaft hole 24 of the housing 2 in order to prevent the T-head 21 from being left off the recess 23.

The housing 2 has a coupler 27 surrounding an exposed terminal 26 or the like connected to the motor 3 or the like. The coupler 27 is located on an opposite side of the cylindrical worm 5 with respect to the motor 3.

Figures 11, 13:
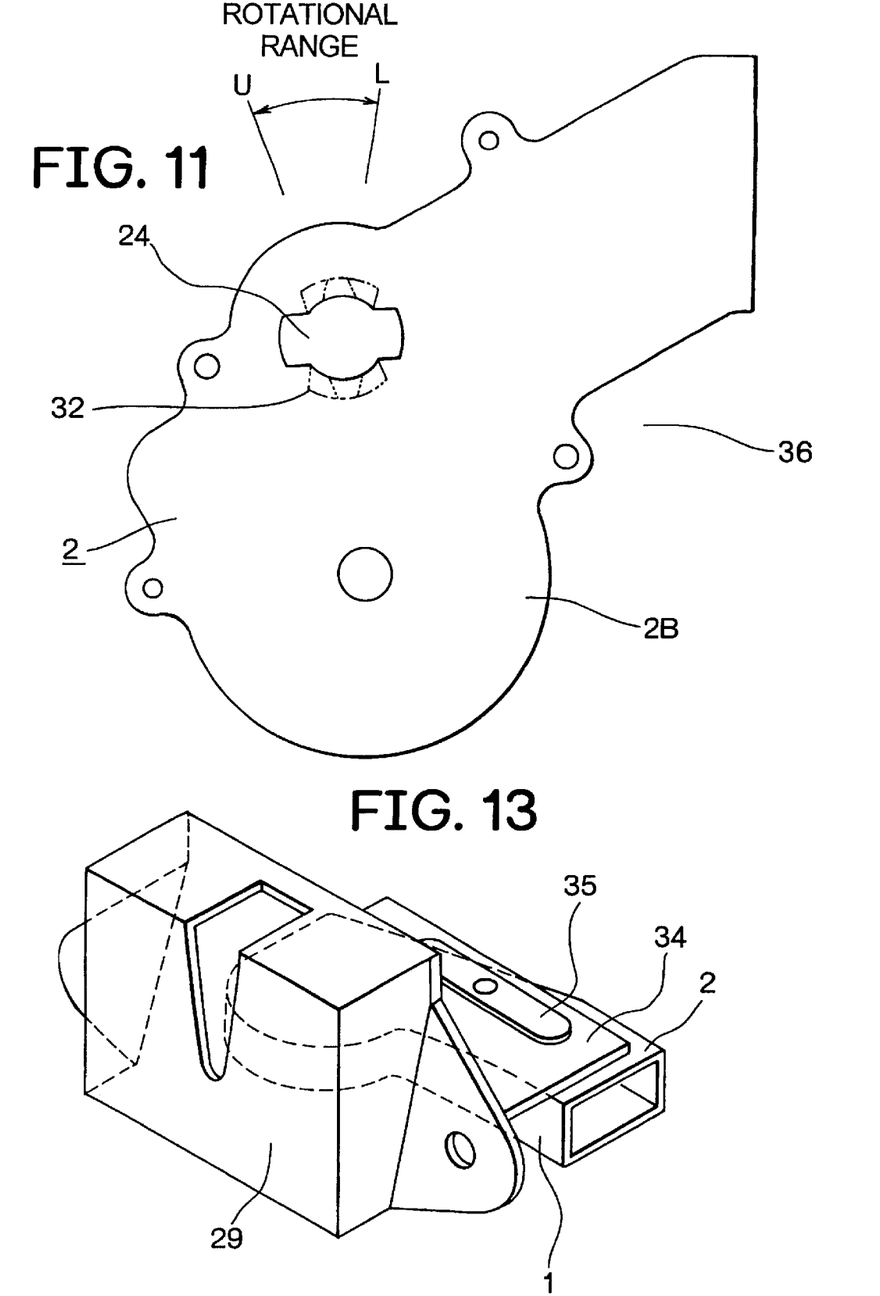
FIG. 11 is a plan view of a cover case of a housing of the actuator unit.
FIG. 13 is a perspective view showing a door latch apparatus and the actuator unit.

FIG. 13 shows a door latch apparatus 29 which is designed to be attached to a wall assembly 28 (FIG. 14) of either one of a cargo room (trunk room) and a tailgate (back door/trunk lid) of a vehicle. As commonly known, the door latch apparatus 29 has a latch (not shown) for keeping the tailgate in a closed state by being engaged with a striker (not shown) fixed on the other of the cargo room and the tailgate, a ratchet (not shown) for holding the engagement between the latch and the striker by being engaged with the latch, and an open lever (not shown) for releasing the ratchet from the latch so as to open the tailgate. The wall assembly 28 of the cargo room or the tailgate comprises an inner metal panel 30 facing to the cargo room and an outer metal panel 31 facing the outside of the vehicle.

The latch apparatus 29 has a bracket 34 which is inserted into an inside space 33 of the wall assembly 28 through a mounting hole 32 formed on the inner metal panel 30 of the wall assembly 28. The bracket 34 is provided with a lock lever 35 which is displaceable between the locked position for disenabling an opening operation of the open lever and the unlocked position for enabling the opening operation of the open lever. The actuator 1 is also attached to the bracket 34. The lock lever 35 is coupled to the output lever 19 of the actuator 1, so that the lock lever 35 can be displaced between the locked position and the unlocked position by the rotation of the output lever 19. Alternatively, it is also possible that the output lever 19 and the lock lever 35 are united to form a single component.

As shown in FIGS. 1 and 11, the housing 2 has a narrow portion in width in which the motor 3 is accommodated, and the housing is generally inflectional in a circular arc or a crescent. On this account, the housing 2 has a hollow portion 36 which is concave toward the motor 3. This shape is obviously different from the shape of the conventional housing M, shown in FIG. 15. The shape of the housing 2 according to the present invention is achieved by disposing the attaching shaft 14 (the output shaft 20) of the rotational lever 13 on the opposite side of the wheel shaft 7 of the worm wheel 6 with respect to the cylindrical worm 5.

When assembling the actuator unit 1, at first, the motor 3, the cylindrical worm 5, the worm wheel 6 and the rotational lever 13 or the like are attached to the base case 2A of the housing 2. Next, the T-head 21 of the output lever 19 (lock lever 35) is inserted into the T-head shaft hole 24 formed on the cover case 2B of the housing 2, and after the output lever 19 is rotated so as to match the direction of the T-head 21 with that of the T-head recess 23, the cover case 2B is attached to the base case 2A. Thereby, the T-head 21 is engaged with the T-head recess 23 of the rotational lever 13, and at the same time the output lever 19 is prevented from being left off the cover case 2B by engagement of the protrusions 22, 22 of the T-head 21 and the cover case 2B. Accordingly, the output lever 19 is completely coupled to the rotational lever 13. On this account, a traditional fixing means such as a screw, an adhesive and a supersonic deposit means or the like is not needed in order to couple the output lever 19 and the rotational lever 13. Then, as shown in FIG. 13, the actuator unit 1 is fixed to the bracket 34 of the door latch apparatus 29, and the output lever 19 is coupled to the lock lever 35 of the door latch apparatus 29.

Figure 14:
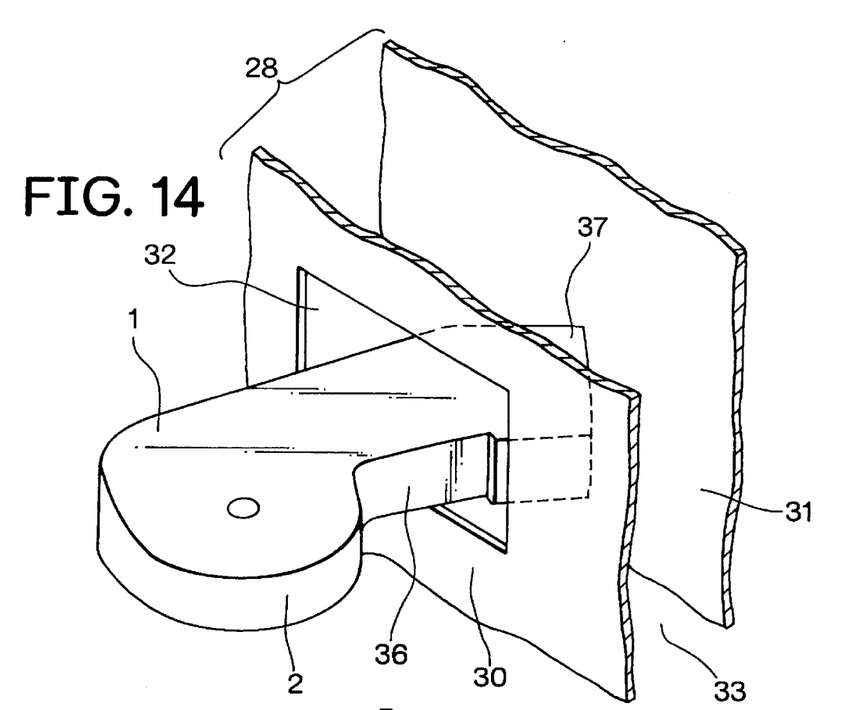
FIG. 14 is a perspective view showing a relation between the actuator unit and a mounting hole formed a wall assembly.

The actuator unit 1 assembled as described above, has a circular arc shape having the hollow portion 36 as a center. Therefore, by inserting the coupler 27 in the mounting hole 32 of the wall assembly 28 as shown in FIG. 14 and rotating the actuator unit 1 around the hollow portion 36, it is possible to pass the actuator unit 1 through the mounting hole 32 without many difficulties even if the mounting hole 32 is rather small. Thus, since the actuator unit 1 has a shape which is suitable for passing through the rather small mounting hole 32, the door latch apparatus 29 is capable of being inserted in the inside space 33 of the wall assembly 28 without difficulties through the mounting hole 32 of the wall assembly 28 even after the actuator unit 1 is attached to the door latch apparatus 29.

Figures 5, 6, 7:
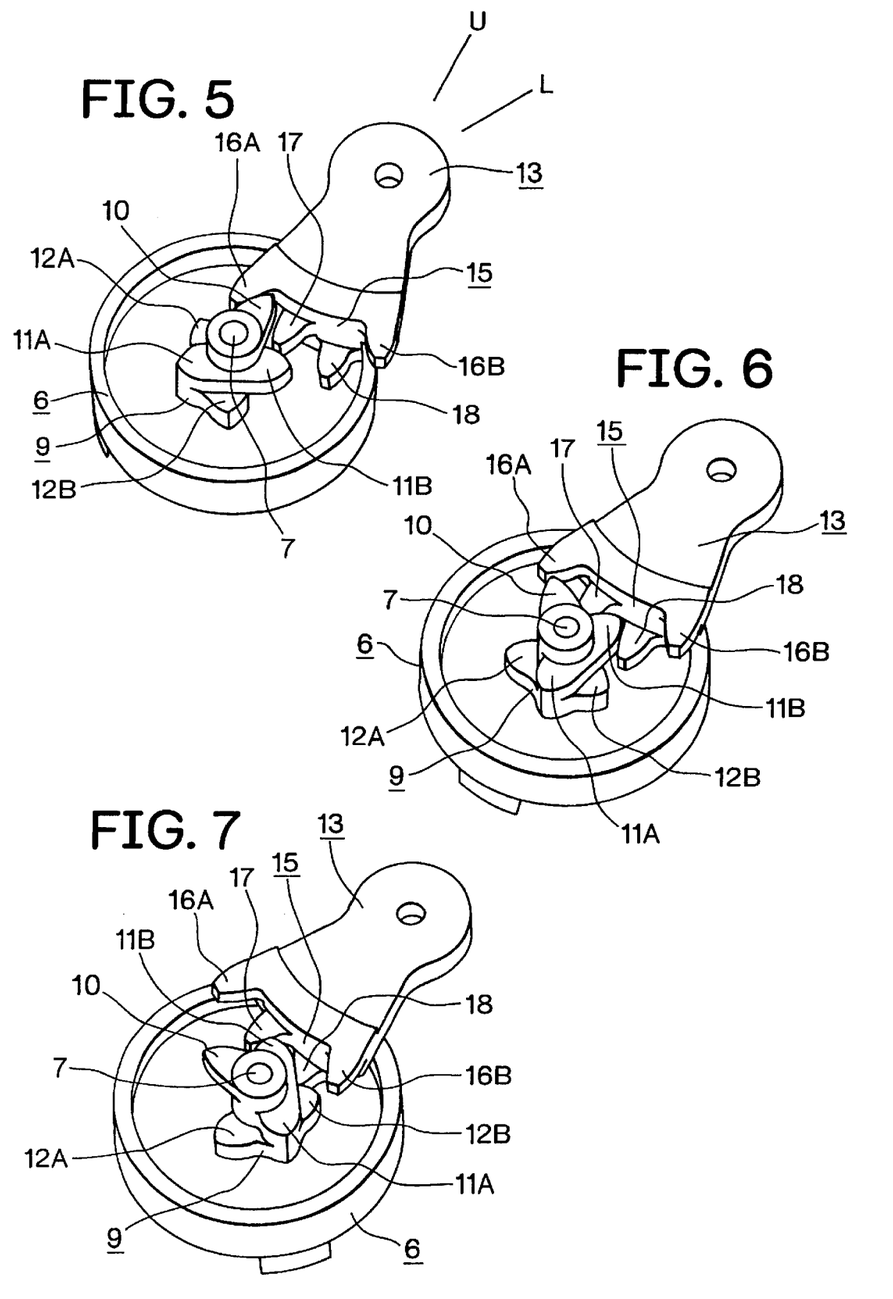
FIG. 5 is a perspective view showing the worm wheel and the rotational lever in the unlocked state.
FIG. 6 is a perspective view showing a state that the worm wheel is slightly rotated in a locking direction from the state in FIG. 5.
FIG. 7 is a perspective view showing a state that the worm wheel is further slightly rotated in the locking direction from the state in FIG. 6.
Figures 8, 9:
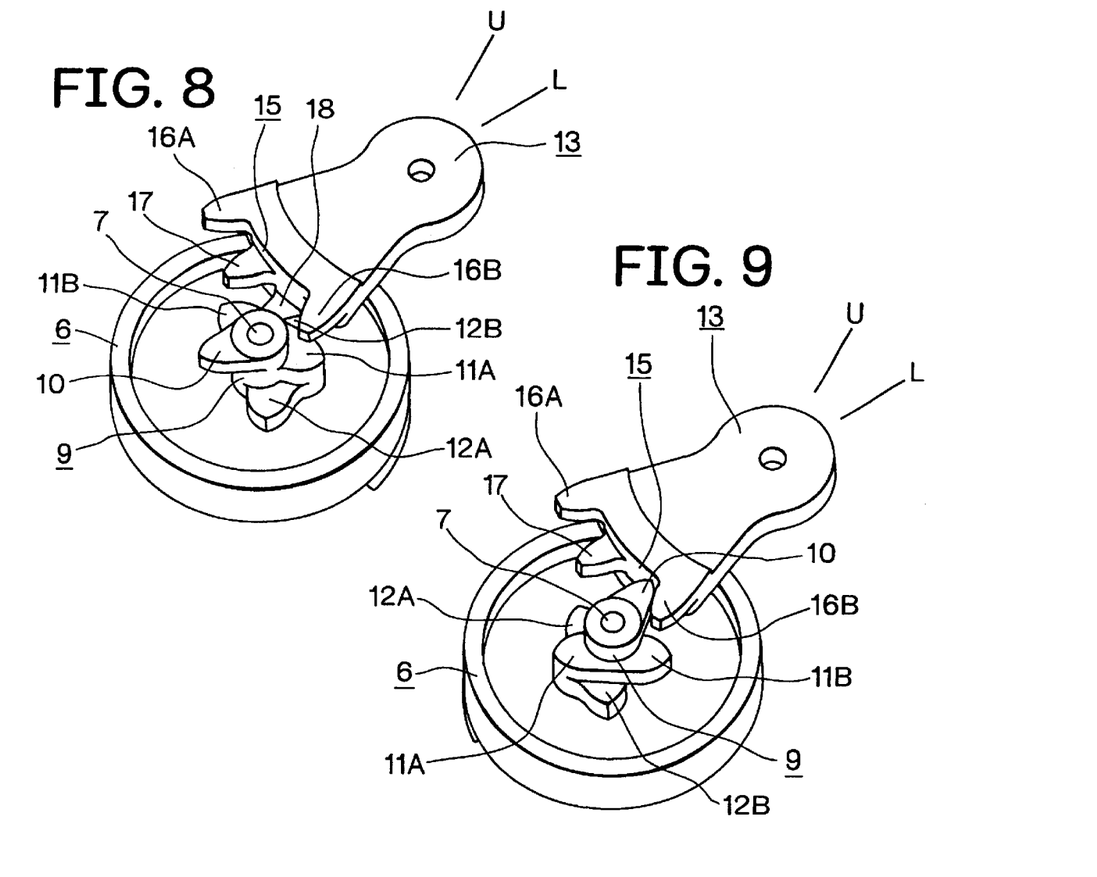
FIG. 8 is a perspective view showing a state that the rotational lever is displaced to a locked position by a locking rotation of the worm wheel.
FIG. 9 is a perspective view showing a state that the worm wheel is restored from the state in FIG. 8 to the neutral position.

Next, the operation of the actuator unit 1 will be explained. FIGS. 1 and 9 show the state where the worm wheel 6 is held on the neutral position by the spring force of the return spring 8 and the rotational lever 13 is located on the locked position L. In this state, the first motor side gear tooth 10 of the output gear 9 abuts against the first lever side gear tooth 16B of the rotational lever 13, but the second and third motor side gear teeth 11A, 11B, 12A, 12B of the output gear 9 are away from the rotational locus of the toothed portion 15. Therefore, when rotating the rotational lever 13 counterclockwise, in the states shown in FIG. 1 and 9, by moving the lock lever 35 (output lever 19) in the unlocking direction, the rotational lever 13 is displaced to the unlocked position U shown in FIGS. 4 and 5 without rotating the output gear 9 (worm wheel 6). In FIGS. 4 and 5, when the rotational lever 13 is rotated in the locking direction, the rotational lever 13 is displaced to the locked position L without rotating the output gear 9. Such a mechanism is a clutch mechanism of the actuator unit 1.

FIGS. 5 to 9 show changes of the engagement state between the output gear 9 and the toothed portion 15 by turns when the worm wheel 6 is rotated in the locking direction by the motor 3. In the unlocked state in FIG. 5, when rotating the worm wheel 6 counterclockwise by the locking rotation of the motor 3, the first motor side gear tooth 10 of the output gear 9 pushes the first lever side gear tooth 16A to rotate the rotational lever 13 clockwise slightly, the second motor side gear tooth 11B then abuts against the second lever side gear tooth 17 to further rotate the rotational lever 13 clockwise, as shown in FIG. 6. Then, as shown in FIG. 7, the third motor side gear tooth 12B of the output gear 9 comes into contact with the third lever side teeth 18 to rotate the rotational lever 13 clockwise, thereby the rotational lever 13 is switched to the locked position L as shown in FIG. 8. When deenergizing the motor 3 by the completion of the displacement of the rotational lever 13 to the locked position L, the worm wheel 6 is reversely rotated by the spring force of the return spring 8 to be returned to the neutral position as shown in FIG. 9, and the first motor side gear tooth 10 abuts just against the first lever side gear tooth 16B.

FIGS. 1 to 4 show changes of the engagement state between the output gear 9 and the toothed portion 15 by turns when the worm wheel 6 is rotated in the unlocking direction by the motor 3. In the locked state in FIG. 1, when rotating the worm wheel 6 clockwise by the unlocking rotation of the motor 3, the first motor side gear tooth 10 of the output gear 9 pushes the first lever side gear tooth 16B to rotate the rotational lever 13 counterclockwise slightly, the third motor side gear tooth 12A then abuts against the third lever side gear tooth 18 to further rotate the rotational lever 13 counterclockwise, as shown in FIG. 2. Then, the second motor side gear tooth 11A abuts against the second lever side gear tooth 17 to displace the rotational lever 13 to the unlocked position U, as shown in FIG. 3. When deenergizing the motor 3 by the completion of the displacement of the rotational lever 13 to the unlocked position U, the worm wheel 6 is reversely rotated by the spring force of the return spring 8 to be returned to the neutral position as shown in FIG. 4, and the first motor side gear tooth 10 abuts just against the first lever side gear tooth 16A.

As being obvious from the above explanation, the worm wheel 6 and the rotational lever 13 of the actuator unit 1 according to the present invention, are coupled each other by two gear members 9 and 15. Therefore, it is possible to set the moving amount (rotational amount) of the rotational lever 13 without depending on the diameter of the worm wheel 6. However, it is noted that the diameter of the worm wheel 6 influences on magnitude of the torque to rotate the rotational lever 13. The actuator unit 1 shown in FIG. 1 is designed in consideration of the rotational torque of the rotational lever 13. In the actuator unit 1 of FIG. 1, when the diameter of the worm wheel 6 is "40", the moving amount of the rotational lever 13 becomes about "12" and the rotational angle of the rotational lever 13 becomes about "29 degrees". However, the diameter of the worm wheel 6 is capable of being changed without influencing on the rotational amount of the rotational lever 13, so that the estimated values of the rotational angle and the rotational amount of the rotational lever 13 with respect of the worm wheel 6 are only served as a reference.

What is claimed is:

1. An actuator unit comprising:
   a motor;
   a cylindrical worm for connection to the motor;
   a worm wheel engaged with the cylindrical worm and supported by a first shaft, said worm wheel being rotated in a first direction and in a second direction opposite to the first direction by power of the motor;
   a return spring for holding the worm wheel in a neutral position;
   an output gear arranged to be rotated integrally with the worm wheel around the first shaft; and
   a rotational lever supported by a second shaft in parallel with the first shaft and displaceable between a first position and a second position, said rotational lever having a toothed portion engaged with the output gear;
   wherein said output gear has a first motor side gear means, a second motor side gear means, and a third motor side gear means;
   wherein said first, second and third motor side gear means are disposed side-by-side to each other in an axial direction of the first shaft;
   wherein said toothed portion has a first lever side gear means engageable only with the first motor side gear means, a second lever side gear means engageable only with the second motor side gear means, and a third lever side gear means engageable only with the third motor side gear means;
   wherein said toothed portion is arranged such that it does not rotate the output gear when the rotational lever is rotated from the first position to the second position or visa versa while the worm wheel is located in the neutral position.

2. An actuator unit according to claim 1, wherein when said worm wheel is located in the neutral position, said first motor side gear means has a gear tooth which can overlap with a rotational locus of the first lever side gear means but cannot be pushed out by rotation of said rotational lever from the first position to the second position or vise versa.

3. An actuator unit according to claim 2, wherein when said worm wheel is located in the neutral position, said second and third motor side gear means have no gear tooth which can overlap with a rotational locus of the second and third lever side gear means, respectively.

4. An actuator unit according to claim 1, wherein said first motor side gear means comprises one gear tooth, and said second motor side gear means comprises two gear teeth, and said third motor side gear means comprises two gear teeth.

5. An actuator unit according to claim 1, wherein said first lever side gear means comprises two gear teeth, and said second lever side gear means comprises one gear tooth, and said third lever side gear means comprises one gear tooth.

6. An actuator unit according to claim 1, wherein said first motor side gear means comprises one gear tooth, and said second motor side gear means comprises two gear teeth, and said third motor side gear means comprises two gear teeth, and wherein said first lever side gear means comprises two gear teeth, and said second lever side gear means comprises one gear tooth, and said third lever side gear means comprises one gear tooth.

7. An actuator unit according to claim 1, further comprising;
   a housing having a base case and a cover case fixed to the base case, said housing accommodating the motor, the cylindrical worm, the worm wheel, the return spring and the rotational lever;
   an output lever located on the outside of the housing and coupled to the rotational lever through an output shaft which passes through the cover case;
   wherein said output shaft has a T-head on one end thereof;
   wherein said cover case has an shaft hole for allowing the T-head to pass therethrough;
   wherein said rotational lever has a recess with which the T-head is engaged.

8. An actuator unit according to claim 1, further comprising a housing for storing the motor, the cylindrical worm, the worm wheel, the return spring, and the rotational lever; wherein said housing is inflectional on a circular arc shape.

* * * * *